United States Patent [19]

Dean

[11] 3,764,551

[45] Oct. 9, 1973

[54] METHOD OF MANUFACTURE OF SINTERED HYPOSTOICHIOMETRIC OXIDES

[75] Inventor: Guy Dean, Suresnes, France

[73] Assignee: Commissariat a l'Energie Atomique, Paris, France

[22] Filed: June 16, 1970

[21] Appl. No.: 46,795

[52] U.S. Cl............ 252/301.1 R, 264/0.5, 423/251, 423/260, 423/261
[51] Int. Cl............................................. C01g 43/02
[58] Field of Search ............... 75/221; 23/344, 354, 23/355; 252/301.1 R; 264/0.5; 423/251, 260, 261

[56] References Cited
UNITED STATES PATENTS

| | | | |
|---|---|---|---|
| 3,354,044 | 11/1967 | Robertson............................. | 23/355 |
| 3,462,371 | 8/1969 | Robertson............................. | 252/301.1 |
| 3,374,178 | 3/1968 | May et al............................. | 252/301.1 |
| 3,320,034 | 5/1967 | Strausberg........................... | 252/301.1 |
| 3,348,943 | 10/1967 | Pollock................................. | 264/0.5 |
| 3,194,852 | 7/1965 | Lloyd.................................... | 264/0.5 |

FOREIGN PATENTS OR APPLICATIONS

| | | | |
|---|---|---|---|
| 766,155 | 8/1967 | Canada................................ | 23/354 |

Primary Examiner—Carl D. Quarforth
Assistant Examiner—F. M. Gittes
Attorney—Cameron, Kerkam & Sutton

[57] ABSTRACT

A method of manufacture of sintered sub-stoichiometric oxides resulting from oxygen deficiency comprising the steps of sintering a mixture of powders of oxide (or oxides) and of carbon in suitable proportions for obtaining the desired sub-stoichiometry by elimination of oxygen in the form of carbon monoxide followed by grinding of the sintered product and a second sintering of the ground product.

5 Claims, No Drawings

METHOD OF MANUFACTURE OF SINTERED HYPOSTOICHIOMETRIC OXIDES

This invention is concerned with the manufacture of sintered hypo-stoichiometric oxides resulting from oxygen deficiency. The invention is more particularly applicable to the production of hypo-stoichiometric dioxides within the general field of fabrication of ceramic fuels consisting of mixed dioxide of uranium and plutonium $(U+Pu)O_2$. However, the invention applies to the preparation of any other oxide which is capable of existing in the hypo-stoichiometric state, even outside a nuclear sphere of application ; this is the case of the rare-earth oxides, for example.

There are well known advantages in the use of oxygen-deficient hypo-stoichiometric dioxides in nuclear fuel elements. These dioxides make it possible to prevent oxidation of fuel cans as a result of the oxygen released from the fuel at the operating temperature of nuclear reactors. Hypo-stoichiometry is obtained in conventional techniques by carrying out the sintering operation in a purified hydrogen atmosphere.

The present invention is essentially intended to overcome the disadvantages attached to the methods of manufacture of hypo-stoichiometric oxides which have been proposed up to the present time and especially the disadvantages arising from the need for very strict control of the sintering atmosphere.

The invention proposes a method of manufacture of sintered hypo-stoichiometric oxides resulting from oxygen deficiency as applicable in particular to the preparation of ceramic fuels consisting of mixed dioxide of uranium and plutonium. Said method essentially comprises sintering a mixture of powders of oxide(s) and of carbon in a suitable proportion for obtaining the desired sub-stoichiometry by elimination of oxygen in the form of CO.

The method is preferably completed by grinding of the sintered product followed by further sintering of the ground product under conditions which are similar to those of the initial sintering operation.

The second sintering step is advantageously carried out after addition of 3 to 5 percent by weight of the unsintered mixture in the ground sintered product in order that an oxide having high density should finally be obtained or after addition of an organic binder in order to obtain a final product having low density with respect to theoretical density.

Said second sintering step makes it possible to eliminate the embrittling effect produced by the evolution of carbon monoxide gas during the initial sintering step ; this effect is observed especially in the case of high hypo-stoichiometries and results in the appearance of cracks in the sintered mass.

In the case of manufacture of mixed oxides, conditions which are less stringent than those required for a single sintering operation can accordingly be applied to the second sintering step provided that the initial sintering step has been carried out at a temperature which is always lower than the melting point but sufficient to cause diffusion in contact with the powder grains until a homogeneous and single-phase solid mass is obtained. This temperature is, for example, at least equal to 1600°C in the case of the mixed oxide $(U+Pu)O_2$.

In accordance with further properties of the invention :

the sintering operation is carried out under a vacuum of at least $10^{-4}$ torr or in a neutral or reducing atmosphere ;

the sintering operation is carried out at a temperature within the range of 1500° to 1800°C for a period of 4 hours ;

the mixture is ground to a particle size smaller than 30 $\mu$ prior to the initial sintering step whilst the product resulting from said initial sintering operation is ground to a particle size between 30 and 250 $\mu$ prior to the second sintering step according to the densities which it is desired to obtain ;

the mixture of powders or the ground product is compacted under a pressure of 2 to 8 t/cm² prior to sintering.

The proportion of carbon is determined in each particular case according to the value of hypo-stoichiometry to be achieved. In order to prevent embrittlement of the sintered oxide, it is an advantage to adopt a proportion of carbon which does not exceed the proportion consumed in order to attain the ultimate value of hypo-stoichiometry which can be achieved inasmuch as higher proportions are liable to result in the appearance of an oxycarbide phase in the sintered oxide. This ultimate value which is already known in the conventional processes is inherent to the nature of the oxide.

In the particular case of uranium and plutonium oxides, only the presence of plutonium oxide in the mixed oxide $(U + Pu)O_2$ permits the preparation of a hypo-stoichiometric sintered oxide having a single-phase structure in which no metallic phase appears next to the oxide phase. In the case of a proportion of $PuO_2$ which increases, for example, from 10 to 30 percent by weight, the ultimate value of hypo-stoichiometry which can be achieved as expressed by $x$ in the formula $(U + Pu)O_{2-x}$, increases from 0.025 to 0.150 corresponding to a ratio $O/(U + Pu)$ which varies between 1.975, and 1.850; within the same range of composition of the mixed oxide, the maximum proportion of carbon in the method according to the invention therefore varies between 0.1 and 0.66% by weight.

It is apparent that smaller proportions of carbon can also be employed in order to attain in that case values of $x$ which are lower than the ultimate value.

The following description relates to examples which are given without limitation and illustrates the application of the method according to the invention.

The method in accordance with the invention has been applied to the preparation of ceramic nuclear fuels consisting of sub-stoichiometric mixed oxides having the formula $(U + Pu)O_{2-x}$. Said fuels are prepared from the following constituents :

a powder of $UO_2$ which is calcined by heating for a period of 4 hours at 1000°C in a reducing atmosphere consisting of argon to which is added 10 percent by volume of hydrogen ;

a powder of $PuO_2$ which is calcined by heating in air at 800°C for a period of 4 hours.

The powders are mixed and ground for a period of 5 hours in a mixture with graphite in suitable proportions in order to obtain the desired hypo-stoichiometry.

The mixture obtained in which the particle size is smaller than 30 $\mu$ is shaped into pellets which are compacted under a pressure of 5 t/cm². These pellets are then heated under a high vacuum (residual pressure lower than $10^{-4}$ torr) to a temperature of 1700°C at which said pellets are maintained for a period of 4 hours.

Starting, for example, from a mixture comprising:

$$UO_2 = 85 \text{ g}$$
$$PuO_2 = 15 \text{ g}$$
$$C = 0.310 \text{ g}$$

there is obtained a mixed oxide having a high density of the order of 95 percent of theoretical density with a ratio $O/(U + Pu) = 1.93$.

The sintered product exhibits a single-phase structure which is free from oxycarbide or from non-diffused $UO_2$. The graphite which was introduced prior to sintering is almost completely eliminated in the form of carbon monoxide gas: the residual carbon content is lower than 30 ppm and is not higher than that which is obtained as a result of reduction by purified hydrogen.

A second sintering step makes it possible to eliminate any cracks caused by evolution of gas during the initial sintering step. The above product is, for example, crushed, ground and screened in order to retain only those particles which have a granular size of less than 250 $\mu$. The powder which is obtained is mixed with 2 or 3 percent of naphthalene, shaped into pellets which are compacted under a pressure of 5 t/cm² and again sintered in vacuum at 1600°C for a period of 4 hours. There is then obtained a mixed oxide having low density of the order of 85° of theoretical density and again having a ratio $O/(U + Pu) = 1.93$.

As an alternative form, when the second sintering step has been completed after addition of 5 percent by weight of the unsintered starting powder ($UO_2 + PuO_2 + C$), there is obtained a product having high density, namely 96 percent of theoretical density.

Further examples of application are given in the accompanying tables.

In the examples of Table I, hypo-stoichiometric mixed oxides $(U + Pu)O_{2-x}$ are prepared by double sintering. The first sintering step consists in treating a powdered mixture of $UO_2$ and $PuO_2$ with graphite. The pre-diffused product obtained is ground and compacted prior to being subjected to the second sintering step after addition of an organic binder (naphthalene) in a variable proportion. The density of the final product, the ratio $O/(U + Pu)$ in said product and the residual carbon content are indicated in each case.

Table II relates to examples of proportions of hypo-stoichiometric plutonium oxide $PuO_{2-x}$. The starting powder is a $PuO_2$ powder which is calcined at 800°C, has a particle size which is smaller than 30 microns and which is compacted under a pressure of 5 t/cm². The powder is sintered under a vacuum ($10^{-4}$ torr) and under the conditions indicated after variable additions of graphite. The ratio $O/Pu$ in the sintered oxide obtained as well as the residual carbon content are indicated in each case.

It is apparent that the different operating conditions which have been mentioned in connection with these examples are not intended to imply any limitation of the invention. In particular, similar results are obtained from the oxide $U_3O_8$ instead of the dioxide $UO_2$ and sintered in a reducing atmosphere of argon and hydrogen can be substituted for sintering in vacuum.

TABLE I

PRODUCTION OF HYPO-STOICHIOMETRIC MIXED OXIDES $(U + Pu)O_{2-x}$ having variable densities by double sintering

| % $d_{th}$ | | O/(U+Pu) | C ppm |
|---|---|---|---|
| 10% $PuO_2$: | | | |
| first sintering step: $UO_2 + PuO_2 + 0.04\%$ moles C in vacuo–1650°C–4 hrs. | | | |
| second sintering step: in vacuo–1680°C–4 hrs. with: | | | |
| +0.5% naphthalene | 96.5 | 1.955 | <30 |
| +5% unsintered powder | | | |
| +2% naphthalene | 96.5 | 1.955 | <30 |
| +3% naphthalene | 94.7 | 1.958 | <30 |
| +4% naphthalene | 93.4 | 1.954 | <30 |
| 20% $PuO_2$: | | | |
| first sintering step: $UO_2 + PuO_2 + 0.09\%$ moles C in vacuo–1650°C–4 hrs. | | | |
| second sintering step: in vacuo–1680°C–4 hrs. with: | | | |
| +0.5% naphthalene | 96.1 | 1.922 | |
| +5% unsintered powder | | | |
| +2% naphthalene | 95.3 | 1.905 | <30 |
| +4% naphthalene | 91.8 | 1.901 | <30 |
| 15% $PuO_2$ | | | |
| first sintering step: $UO_2 + PuO_2 + 0.075 \%$ moles C in vacuo–1650°C–5 hrs. | | | |
| second sintering step: in vacuo with: | | | |
| +2% naphthalene | 95.3 | 1.930 | 16 |
| +5% unsintered powder 1650°C–5 hrs. | | | |
| +2% naphthalene 1570°C–4 hrs. | 88.0 | 1.925 | |
| +3% naphthalene 1570°C–4 hrs. | 76.1 | 1.925 | |

TABLE II

Production of hypo-stoichiometric mixed oxides $PuO_{2-x}$ from $PuO_2$ calcined at 800°C

| +C % moles | Sintering | O/Pu | C ppm |
|---|---|---|---|
| 0.36 | 1600°C — 4 hours | 1.650 | 30 |
| 0.48 | 1600°C — 4 hours | 1.561 | 30 |
| 0.48 | 1600°C — 4 hours | 1.547 | 30 |
| 0.52 | 1600°C — 4 hours | 1.553 | 30 |
| 0.55 | 1500°C — 10 hours | 1.510 | 85 |

What we claim is:

1. A method of manufacture of sintered hypostoichiometric dioxides comprising the steps of sintering at a temperature between 1600° and 1800° C. a mixture of powdered carbon and metal dioxides selected from the group consisting of uranium and plutonium, the amount of carbon added being less than 0.125% moles, grinding the sintered product and sintering the ground product at a temperature between 1500° and 1800°C., both sintering steps being performed for about four hours in an oxygen free atmosphere under vacuum of about $10^{-4}$ torr and at a pressure of about 5t/CM².

2. A method according to claim 1, the powdered metal oxide being mixed dioxides of uranium and plutonium.

3. A method according to claim 1 wherein the second sintering is carried out after addition of 3 to 5 percent by weight of the unsintered mixture in the ground sintered product to obtain an oxide having high density.

4. A method according to claim 1 wherein the second sintering is carried out after addition of an organic binder within the range of 0.2 to 5 percent by weight to obtain a final product having low density with respect to theoretical density.

5. A method according to claim 1 wherein the mixture is ground to a particle size smaller than 30 microns prior to the first sintering and the product resulting from said first sintering is ground to between 30 and 350 microns prior to the second sintering.

* * * * *